Figure 1:
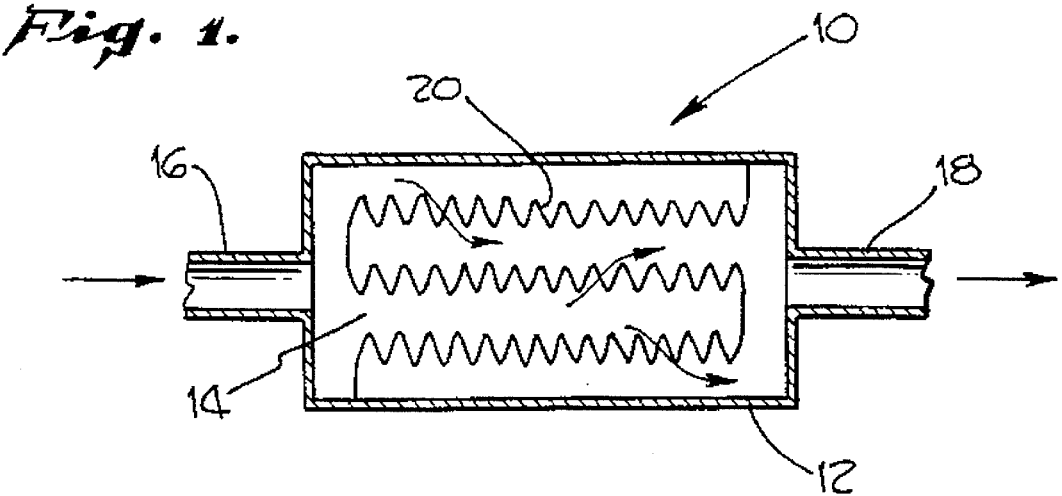

United States Patent [19]

Friedlander et al.

[11] Patent Number: 5,541,147
[45] Date of Patent: Jul. 30, 1996

[54] IMMOBILIZED FREE MOLECULE AEROSOL CATALYTIC REACTOR

[75] Inventors: Sheldon K. Friedlander, Pacific Palisades; Lawrence B. Fischel, Culver City, both of Calif.

[73] Assignee: The Regents of the University of California, Oakland, Calif.

[21] Appl. No.: 975,906

[22] Filed: Nov. 12, 1992

Related U.S. Application Data

[63] Continuation of Ser. No. 655,672, Feb. 14, 1991, abandoned.
[51] Int. Cl.$^6$ .............................. B01J 21/00; B01J 23/38
[52] U.S. Cl. ................... 502/100; 502/262; 502/333; 502/334; 502/339; 502/345
[58] Field of Search .............................. 502/262, 333, 502/334, 339, 345, 100

[56] References Cited

U.S. PATENT DOCUMENTS

| | | | |
|---|---|---|---|
| 3,920,583 | 11/1975 | Pugh | 252/465 |
| 3,943,067 | 3/1976 | Chan et al. | 252/430 |
| 3,954,601 | 5/1976 | Cosyns et al. | 208/143 |
| 4,038,214 | 7/1977 | Gotoh et al. | 252/458 |
| 4,046,712 | 9/1977 | Cairns et al. | 252/447 |
| 4,102,819 | 7/1978 | Petrow et al. | 252/460 |
| 4,233,183 | 11/1980 | Inaba et al. | 252/432 |
| 4,399,185 | 8/1983 | Petrow | 428/253 |
| 4,513,101 | 4/1985 | Peters et al. | 502/304 |
| 4,536,482 | 8/1985 | Carcia | 502/5 |
| 4,791,091 | 12/1988 | Bricker et al. | 502/303 |
| 4,849,399 | 7/1989 | Joy, III et al. | 502/333 |
| 5,053,377 | 10/1991 | Lerot | 502/226 |
| 5,061,464 | 10/1991 | Cordonna, Jr. et al. | 423/213.5 |
| 5,106,802 | 4/1992 | Horiuch et al. | 502/65 |
| 5,114,902 | 5/1992 | Schwarz et al. | 502/334 |
| 5,330,956 | 7/1994 | Haga et al. | 502/261 |

FOREIGN PATENT DOCUMENTS

| | | | |
|---|---|---|---|
| 54-149389 | 11/1979 | Japan | 502/262 |
| 1455248 | 11/1976 | United Kingdom . | |
| 1537839 | 1/1979 | United Kingdom . | |

OTHER PUBLICATIONS

"Basic College Chemistry" by Joseph A Babor 2nd ed. 1953 Thomas Y Crowell New York p. 256 no month.

Hegedus, L. L., "Effects of Channel Geometry on the Performance of Catalytic Monoliths," Symposium on Catalytic Approaches to Environmental Control, American Chemical Society, Chicago Meeting, August 26–31, 1973, pp. 487–503.

Pereira, C. J., Kim, G., and Hegedus, L. L., "A Novel Catalyst Geometry for Automobile Emission Control," Catal. Rev. Sci. Engin, 26(3 & 4), pp. 503–523 (1984) no month.

Mondt, J. R., "Adapting the Heat and Mass Transfer Analogy to Model Performance of Automotive Catalytic Converters," Journal of Engineering for Gas Turbines and Power, vol. 109, pp. 200–206, (Apr. 1987).

Nicholas, D. M., Shah, Y. T., "Carbon Monoxide Oxidation over a Platinum–Porous Fiber Glass Supported Catalyst," Ind. Eng. Chem., Prod. Res. Dev., vol. 15, No. 1, pp. 35–40 (1976) no month.

Nicholas, D. M., Shah, Y. T., Ziochower, I. A., "Oxidation of an Automobile Exhaust Gas Mixture by Fiber Catalysts," Ind. Eng. Chem., Prod. Res. Dev., vol. 15, No. 1, pp. 29–35 (1976) no month.

(List continued on next page.)

Primary Examiner—Gary P. Straub
Assistant Examiner—Timothy C. Vanoy
Attorney, Agent, or Firm—Poms, Smith, Lande & Rose

[57] ABSTRACT

A catalytic reactor bed in which support particles in the free molecule size range of 50 to 500 Ångstroms are attached to an anchor surface to form a dendritic network which extends from 10 microns to 300 microns outward from the anchor surface. Catalyst particles which are also in the free molecule in the size range of 10 to 80 Ångstroms are attached to and dispersed throughout the support particle network. A process for making the reactor bed using binary gas phase nucleation of support particle and catalyst particle precursors is also disclosed.

15 Claims, 2 Drawing Sheets

OTHER PUBLICATIONS

Formenti, M., Juillet, F., Meriaudeau, P., Teichner, S. J., Vergnon, P., "Preparation in a Hydrogen—Oxygen Flame of Ultrafine Metal Oxide Particles," Journal of Colloid and Interface Science, vol. 29, No. 1, pp. 79–89 (1972) Apr.

Helble, J. J., Sarofim, A. F., "Factors Determining the Primary Particle Size of Flame–Generated Inorganic Aerosols," Journal of Colloid and Interface Science, vol. 128, No. 2, pp. 348–170 (Mar. 1989).

Nielsen, M. L., Hamilton, P. M. Walsh, R. J., "Ultrafine Metal Oxides by Decomposition of Salts in a Flame," *Ultrafine Particles,* W. E. Kuhn, Ed., John Wiley & Sons, Inc., New York, 1963, pp. 181–195. no month.

Ulrich, Gail. D., "Theory of Particle Formation and Growth in Oxide Synthesis Flames," Combusion Science and Tech., vol. 4, pp. 47–57 (1971) no month.

Wei, J., "Catalysis for Motor Vehicle Emissions," *Advances in Catalysis,* vol. 24, pp. 57–128 (1975) no month.

Andres, R. P., "Nucleation from the Vapor Phase," Ind. and Engineering Chemistry, vol. 57, No. 10, pp. 25–31 (Oct. 1965).

IMMOBILIZED FREE MOLECULE AEROSOL CATALYTIC REACTOR

This invention was made with support under contract number CBT-85-16862 from the National Science Foundation, and contract number CR-812771 from the Environmental Protection Agency. Accordingly, the U.S. government has certain rights in the invention.

This is a continuation of application Ser. No. 07/655,672, filed on Feb. 14, 1991, now abandoned.

BACKGROUND OF THE INVENTION

1. Field of the Invention

The present invention generally involves support systems used to immobilize and position catalyst particles to provide improved catalytic activity and enhanced contact between gases and catalyst particles. More particularly, the present invention relates generally to catalysts used to reduce the emission of pollutants.

2. Description of Related Art

Oxidation catalysts are used to reduce the emission of pollutants in automotive and industrial process exhaust gases. The noble metals are the most commonly used catalysts for exhaust treatment because of their activity for carbon monoxide and hydrocarbon oxidation and resistance to being oxidized (Jung, H. J. and E. R. Becker, "Emission Control for Gas Turbines," *Platinum Metals Rev.*, 31(4), 162–170, 1987). With rising environmental concern and more stringent emission standards, the demand for these catalysts is rapidly increasing. As a result, there is a need to not only increase the effectiveness and efficiency of the catalysts in reactors, but also to reduce the amount of catalyst required for acceptable operation.

Presently, automotive emissions are treated either by the monolith or the pellet bed. In both types of converter, mass transfer limits the rate of pollutant conversion. The monolith is a metal or ceramic battery of channels of various shapes and sizes (Hegedus, L. L., "Effects of Channel Geometry on the Performance of Catalytic Monoliths," *Symposium on Catalytic Approaches to Environmental Control Presented Before the Division of Petroleum Chemistry, Inc.*, American Chemical Society: Chicago Meeting, August 26–31, 1973; Pereira, C. J., G. Kim, and L. L. Hegedus, "A Novel Catalyst Geometry for Automobile Emission Control," *Catal. Rev.—Sci. Eng.*, 26 (3 & 4), 503–523, 1984). The interior surfaces of the channels are coated with alumina support and noble metal catalyst. The pellet bed converter is a fixed bed of various sizes of spherical or cylindrical ceramic pellets impregnated with noble metal catalyst (Mondt, J. R., "Adapting the Heat and Mass Transfer Analogy to Model Performance of Automotive Catalytic Converters," *Journal of Engineering for Gas Turbines and Power.* 109, 200–206, 1987).

Existing practices for impregnating monoliths, zeolites or ceramic support particles with noble metals involve either a liquid washcoat technique, ion-exchange, or sputtering (Satterfield, C. N. *Heterogeneous Catalysis in Practice.* McGraw-Hill Book Company, New York, 1980). The liquid washcoat method usually involves immersion of the support into a liquid solution of the metal precursor, the evaporation of the solvent, and the thermal decomposition of the precursor. Ion-exchange is similar to the washcoat technique except that the metal is electrically plated from the solution. Sputtering is the vaporization of the metal to condense on the cooled support.

An exemplary sputtering procedure for depositing platinum catalyst onto alumina particles is disclosed in U.S. Pat. No. 4,046,712. The platinum is sputtered onto alumina particles which are larger than 1000 Ångstroms. After the platinum is deposited on the alumina particles, the resulting catalytic particles are dispersed upon larger alumina particles or other support material.

In addition to the monolith and pellet supports, a fiber supported platinum catalyst has also been made (Nicholas, D. M. and Y. T. Shah, "Carbon Monoxide Oxidation over a Platinum-Porous Fiber Glass Supported Catalyst." Industrial and Engineering Chemistry, Product Research and Development, Vol. 15, No. 1, 1976, pp. 35–40; and Nicholas, D. M., Y. T. Shah, and I. A. Zlochower, "Oxidation of an Automobile Exhaust Gas Mixture by Fiber Catalysts," Industrial and Engineering Chemistry, Product Research and Development, Vol. 15, No. 1, 1976, pp. 29–35.). In this fiber support system, a glass fibrous filter is impregnated with platinum by the washcoat technique. Another fiber supported catalyst system is disclosed in U.S. Pat. No. 4,399,185. This particular catalytic system utilizes a loosely packed quartz fiber mat which has been coated with colloidal alumina and platinum particles.

The pressure drop experienced by polluted gases as they pass through the catalytic reactor bed is another area where improvement is needed. Pressure drop is caused by the large amount of catalyst and support material and the need to effect high mass transfer. Higher flow rates decrease the pore and boundary layer mass transfer resistances but increase the pressure drop. The pore and boundary layer mass transfer resistances arise because the pore size is larger than the mean free path of the gases flowing through. It would be desirable to reduce the pressure drop as much as possible without sacrificing catalyst activity or efficiency.

As is apparent from the above, there is a continuing need to develop improved catalyst support systems in which the pore and boundary layer mass transfer resistances which occur in presently available systems are reduced or eliminated and in which the pressure drop is reduced. Such catalyst support systems should also be mechanically and thermally stable while still providing optimum contact between reactant and catalyst particles.

SUMMARY OF THE INVENTION

In accordance with the present invention, a catalytic bed reactor is disclosed which includes a novel support network structure that immobilizes the catalyst particles. The catalyst particles and support particles are formed together as a binary free molecule aerosol. The immobilization of the catalyst particles and support particles from a free molecule aerosol provides a reactor bed having free molecule pores which optimizes catalytic interaction and activity while at the same time reducing the required pressure drop. The term "free molecule" when used in connection with aerosol particles means that the sizes of the aerosol particles are much less than the mean free path of the gas to be passed through the reactor. When used in connection with the pores present in the immobilized particles, the term "free molecule" means that the sizes of many of the pores in the reactor bed are less than the mean free path of the gas being passed through the reactor bed.

The present invention is based upon a catalytic reactor bed in which a support particle network is attached to and extends outward from an anchoring surface. The support particle network is of fractal or dendritic configuration and made up of support particles having particle sizes in the range of about 50 to 500 Ångstroms. The catalyst particles for the reactor bed are attached to the support particles and dispersed throughout the support particle network at separate locations. The catalyst particles have particle sizes in the range of about 10 to 80 Ångstroms. The support particle network extends from 10 microns to 300 microns outward from the anchor surface. The size of the particles and the resulting pores in the reactor bed are all less than the mean free path of gases typically passed through the reactor bed. As a result, the efficiency and flow characteristics of the reactor bed are optimized.

As a feature of the present invention, it was discovered that the support particle network and attached catalyst particles could be produced by nucleation from a binary vapor of support and catalyst precursors to form a free molecule binary aerosol which includes support particles and catalyst particles. The two precursors are introduced into a heating zone where the precursors react or decompose to form a free molecule aerosol of support particles and catalyst particles. The particles from the binary aerosol mixture are deposited onto an anchor surface to form the support particle network with catalyst particles dispersed throughout the network.

The support particles and catalyst particles present in the binary aerosol are distinct and separate, and remain distinct and separate as they aggregate in the flame and while depositing on the anchor surface. Nucleation of the separate support and catalyst particles from the binary vapor mixture of precursors followed by deposition of the particles onto an anchor surface provides a simple and efficient process for producing catalytic reactor beds which can be used for a wide variety of purposes.

The above-described and many other features and attendant advantages of the present invention will become better understood by reference to the following detailed description when taken in conjunction with the accompanying drawings.

BRIEF DESCRIPTION OF THE DRAWINGS

FIG. 1 is a schematic representation of an exemplary catalytic converter system incorporating the catalytic reactor bed in accordance with the present invention.

FIG. 2 is a schematic representation of the structure of the catalytic reactor bed in accordance with the present invention.

FIG. 3 is a schematic representation of a preferred exemplary system for producing a preferred exemplary catalytic reactor bed.

DETAILED DESCRIPTION OF THE INVENTION

The catalytic reactor bed in accordance with the present invention may be used in a wide variety of applications including gas masks, fugitive emissions, aircraft emissions, automotive emissions, industrial process gas treatment or any system requiring a highly efficient, compact, lightweight and portable catalytic converter unit. A preferred exemplary catalytic converter system is shown diagrammatically in FIG. 1 at 10. The catalytic converter unit 10 includes a shell 12 which surrounds and defines a catalytic reactor zone 14. The shell 12 includes an inlet 16 through which pollutant containing gases are introduced into the reactor zone 14. The shell or housing 12 also includes an outlet 18 through which the gas is removed from the reactor zone 14 after catalytic conversion of pollutants. The particular size, configuration and shape of the catalytic converter unit 10 will vary depending upon the use intended for the unit and the type of gas to be treated.

In accordance with the present invention, the catalytic converter unit 10 includes a catalytic reactor bed 20 which is shown diagrammatically in FIG. 1. The preferred reactor bed 20 includes fibers which function as anchoring surfaces for the support particle network. Although a fibrous anchor surface is preferred, any other type of anchoring surface conventionally used for supporting and immobilizing catalyst particles may be used. The anchor fibers are preferably quartz, glass, ceramic or carbon. Quartz fibers are particularly preferred due to their inert nature and resistance to high temperatures. The anchor fibers preferably have diameters of between about 0.1 micron to 10 microns. Fibers with diameters of about 1 micron are particularly preferred. The fibers may be arranged in a variety of configurations which are known generally and used in fiber supported catalytic converters. For example, the fibers may be arranged randomly within the reactor zone 14 or they may be arranged as pleated fiber sheets, Random fiber supports such as quartz wool are suitable. Filter designs such as the Hepa filter (Flanders Filters, Inc., Bulletin No. 812E) are also suitable for use as anchoring fibers. Other suitable anchoring surfaces include stainless steel fine mesh or other porous materials.

A detailed pictorial representation of the catalytic reactor bed 20 on a microscopic scale is shown in FIG. 2. The fibers are shown in cross-section at 22. The fibers are oriented to form a fiber mat having a surface designated by line 24. The support particles are shown in FIG. 2 as the smaller circles which are attached to and extend outward from the anchoring fibers 22. One of the support particles in FIG. 2 is numbered 23 for identification purposes. The support particles 23 form a network which extends from 10 microns to 300 microns outward from the surface 24 of the fiber mat. The support particles have a size range of between about 50 to 500 Ångstroms with about 150 Ångstroms being the preferred support particle size. The support particles may be made from any of the conventionally used support materials, such as alumina, silica or titania. Alumina is the preferred support particle material.

The catalyst particles in FIG. 2 are represented by the black dots which are attached to the support particles and dispersed throughout the support particle network. One of the catalyst particles in FIG. 2 is numbered 25 for identification purposes. The catalyst particles can be made from any of the known catalytic materials, such as the platinum or palladium. Other catalysts which may be used include copper oxide and noble metals, such as rhenium. The catalyst materials for use in accordance with the present invention must be available as volatile precursors such as carbonyl or an organometallic compound containing the catalyst. Examples include acetylacetonates, hexafluoro acetylacetonates, cyclopentadienyls and butadienyls. The decomposition rate of the catalyst precursor at elevated temperatures should be greater than that of the precursor for the support particles. The size of the catalyst particles ranges from about 10 to 80 Ångstroms. Catalyst particles having an average size of about 35 Ångstroms are preferred.

The relative amounts of catalyst and support particles may be varied depending upon the intended use for the reactor bed. Preferably, the catalyst loading of the support particles will be in the range of about 10 to 20 percent catalyst by mass relative to the total mass of the catalyst and support particles. Higher or lower percentages of catalyst loading are also possible.

The following description of an exemplary process for making the catalytic reactor bed of the present invention is directed to platinum catalyst particles immobilized in an alumina support particle network which is anchored to quartz fibers. It will be understood by those skilled in the art that this process is exemplary only and that the present invention has wide application to catalytic beds comprising other catalytic particles, support particles and anchoring fiber screens or other porous surfaces.

The preferred process for making catalytic reactor beds in accordance with the present invention involves nucleation from a binary mixture of support particle precursor and catalyst particle precursor to form a free molecule aerosol of separate particles followed by deposition of the particles onto the anchoring surface as an immobilized free molecule aerosol of particles. The particle sizes of the particles formed in the binary aerosol will range from 50 to 500 Ångstroms for the support particles and from 10 to 80 Ångstroms for the catalyst particles. An exemplary system for carrying out this binary nucleation and deposition is shown schematically in FIG. 3.

The nucleation system includes a burner 30 or other flame generation system into which the support particle and catalyst particle precursors are introduced for oxidation or thermal decomposition. A reservoir 32 is provided for the catalyst particle precursor. Reservoir 34 is provided for the support particle precursor. Nitrogen or other suitable carrier gas is maintained in reservoir 36. The nitrogen gas is used to transport the precursors from their respective reservoirs 32 and 34 into the burner 30. Oxygen traps 38 are provided to insure that pure nitrogen is used in the system. Nitrogen control valves 40 are operated to control the relative amounts of nitrogen, catalyst particle precursor and support particle precursor that are being transported to burner 30 through their respective feed lines. The dashed lines surrounding the feed lines into burner 30 indicate heating tape which is used to accurately control the temperature of the gases as they enter the burner. Methane is used to fuel the flame 42 which is supported by burner 30. The methane is controllably introduced into burner 30 from reservoir 44 by way of control valve 46. The pressures in the nitrogen reservoir and methane reservoir are monitored utilizing pressure gauges 48 and 50, respectively. In addition, rotameters 52 are provided to monitor the flow of nitrogen through the catalyst particle reservoir 32 and support particle reservoir 34. Rotameter 54 is provided for monitoring flow of pure nitrogen to dilute the precursors as they flow to burner 30.

The fiber mat or other porous surface onto which the particles and aggregates are deposited is shown schematically at 56. A T-connection or valve is positioned at 58 to provide control of the amount of particles which are deposited onto the porous support or filter 56. A vacuum pump system is provided for depositing the particles onto the fibers and evacuating any reaction and decomposition by-products from the system. The vacuum system includes a vacuum pump 60, liquid water trap 62, drierite water trap 64 and acid trap 66 which includes concentrated sodium hydroxide. The flow of gases through the recovery system is monitored via rotameter 68 as controlled by valve 70. The vacuum in the recovery system is measured utilizing pressure gauge 72. The combustion gases and entrained by-products are passed through a copper coil 74 after the particles have been deposited and prior to entering the recovery or purification portion of the system.

Operation of the system involves introducing the selected catalyst particle precursor and support particle precursor vapors from their respective reservoirs into the burner flame. The precursors decompose or otherwise react to form particles by nucleation which are entrained in the burner flame and carried upward for deposition onto the fiber mat or other porous surface 56.

Any of the well-known volatile catalyst precursor compounds may be utilized in this process. Preferred catalyst precursors are platinum (II) bis-(hexafluoroacetylacetonate), platinum (II) bis-(acetylacetonate), palladium (II) bis-(hexafluoroacetylacetonate) or palladium (II) bis-(acetylacetonate). Preferred support particle precursors include trimethylaluminum, triethylaluminum, triisobutyl aluminum or aluminum tri-sec-butoxide. The catalyst particle and support particle precursors are preferably selected so that the support particle precursor is converted to support particles at a faster rate during nucleation of the particles in the flame. The relative amounts of catalyst particle precursor and support particle precursor which are introduced into the flame heating zone can be varied to obtain the desired ratio of catalyst to support material. It is preferred that the relative amounts of precursors be regulated so that loading of the support particle network is maintained at about 0.25 mg catalyst/support per square centimeter of filter layer. The preferred loading of the fiber mat with catalyst and support particles is from about 0.15 mg of catalyst/support particles per 10 mg of fiber mat to over 12 mg of catalyst/support particles per 10 mg of fiber mat.

An example of practice is as follows. The apparatus of FIG. 3 was utilized to prepare a catalytic reactor bed in accordance with the present invention utilizing trimethylaluminum (TMA) as the support particle precursor and platinum (II) bis-hexafluoroacetylacetonate (PtHFAcAc) as the catalyst particle precursor. Trimethylaluminum has a vapor pressure of 13 mmHg at 25° C. and is spontaneously inflammable in air. Platinum (II) bis-hexafluoroacetonate has a vapor pressure by sublimation of about 0.1 mmHg at 75° C. and is stable in air. It is believed that the TMA oxidizes faster than the PtHFAcAc decomposes in the flame nucleation process. As previously mentioned, this is preferred because, the support particles are formed prior to catalyst particle formation and thus the individual catalyst particles are dispersed on existing support particles as the catalyst particles are formed.

The actual apparatus for carrying out the experiment included a reservoir 34 for the TMA which was composed of a 3-port gas bubbler in which the TMA was kept. Nitrogen was bubbled through the gas bubbler to entrain TMA and transport it to the burner. The PtHFAcAc reservoir 32 included a stainless steel filter holder which contained powdered PtHFAcAc spread over a fibrous filter. The nitrogen was passed through this filter and the entrained PtHFAcAc was transported, after combining with TMA and pure nitrogen (dilution) streams, through a length of ⅛ inch OD stainless steel tubing sheathed with ¼ inch OD copper tubing to the burner. All three components (TMA, PtHFAcAc and nitrogen dilution stream) were combined and injected together through a single orifice. The burner was a grid top burner containing a grid which was 3.8 cm in diameter. The grid had 2.5 mm square channels which extended 1 cm into the burner. The burner was modified to enable injection of the platinum and alumina precursors into the base of the flame by passing the lengths of tubing up the middle. Methane was supplied at 800 ml/min through a jet at the base of the burner. The methane was entrained in ambient air and gave a laminar, premixed flame. The nucleated particles were withdrawn from the flame through a T-connector on the end of 0.5 m of ¼ inch stainless steel tubing. This sampling probe was aligned 3 cm above the precursor injection orifice. The sampling flow rate was about twice the flame effluent flow rate. Ambient air entering from the side of the T-connector mixed the particles throughout the sampling stream and made the deposit uniform over the filter cross-section.

A Whatman QM-A quartz fiber filter (47 mm diameter and about 0.45 mm thick) supported in a stainless steel filter holder captured the particles over the central 35 mm diameter portion. Clean filters weighed about 8.5 mg/cm$^2$ and the quartz fibers, randomly oriented flexed cylinders, occupied about 5% of the filter volume. The fiber diameters were on the order of 1 micron. Heating the filter in air at about 200° to 240° C. for 18 hours prior to use removed absorbed impurities.

Typical operation of the unit involved charging reservoirs, positioning the quartz fiber filters, aligning the sampling probe, heating the carrier gas tubes, adjusting the flow rates, igniting the flame and starting the sampling pump. The duration of vacuum pump operation was from 1 to 8 minutes. To form the support particle network in accordance with the present invention, the amount of precursors being introduced into the flame were controlled so that loading of the alumina particles with platinum catalyst particles was maintained at about 0.75 mg of Pt/Al$_2$O$_3$ per square centimeter of filter surface. It should be noted that the filter surface included three layers. Accordingly, the overall loading was about 0.25 mg of Pt/Al$_2$O$_3$ per square centimeter of each layer. The total loading for the combined three layers was therefore about 0.75 mg of Pt/Al$_2$O$_3$ per square centimeter.

Three samples of catalytic reactor beds prepared utilizing this system and process were analyzed for composition and catalytic activity. Table 1 contains the masses of platinum and alumina, the platinum dispersion, the corresponding platinum spherical particle size and the penetration depth for each sample. The total deposit mass was corrected for carbon removed in the initial oxidation but not for moisture removed.

TABLE I

Immobilized Free Molecule Aerosol Reactor Properties[a]

| Sample number | Al$_2$O$_3$[b] (mg) | Pt[b] (mg) | Pt Dispersion[c] (%) | Pt Particle size[d] (Å) | Penetration[e] (μm) |
|---|---|---|---|---|---|
| 1 | 0.35 | 0.053 | 19 | 52 | 50 |
| 2 | 0.54 | 0.12 | 15 | 66 | 170 |
| 3 | 1.38 | 0.32 | 16 | 61 | 97[f] |

Figure 2:
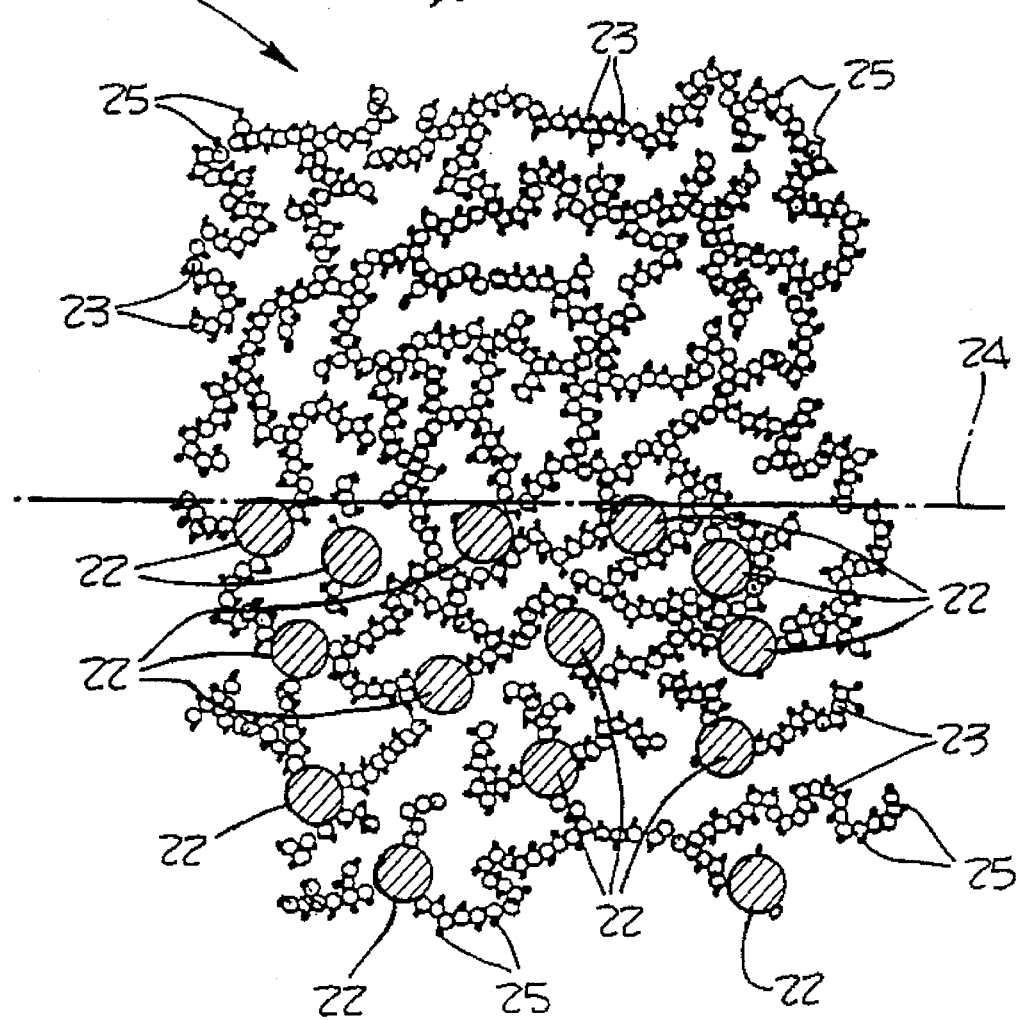
Figure 3:
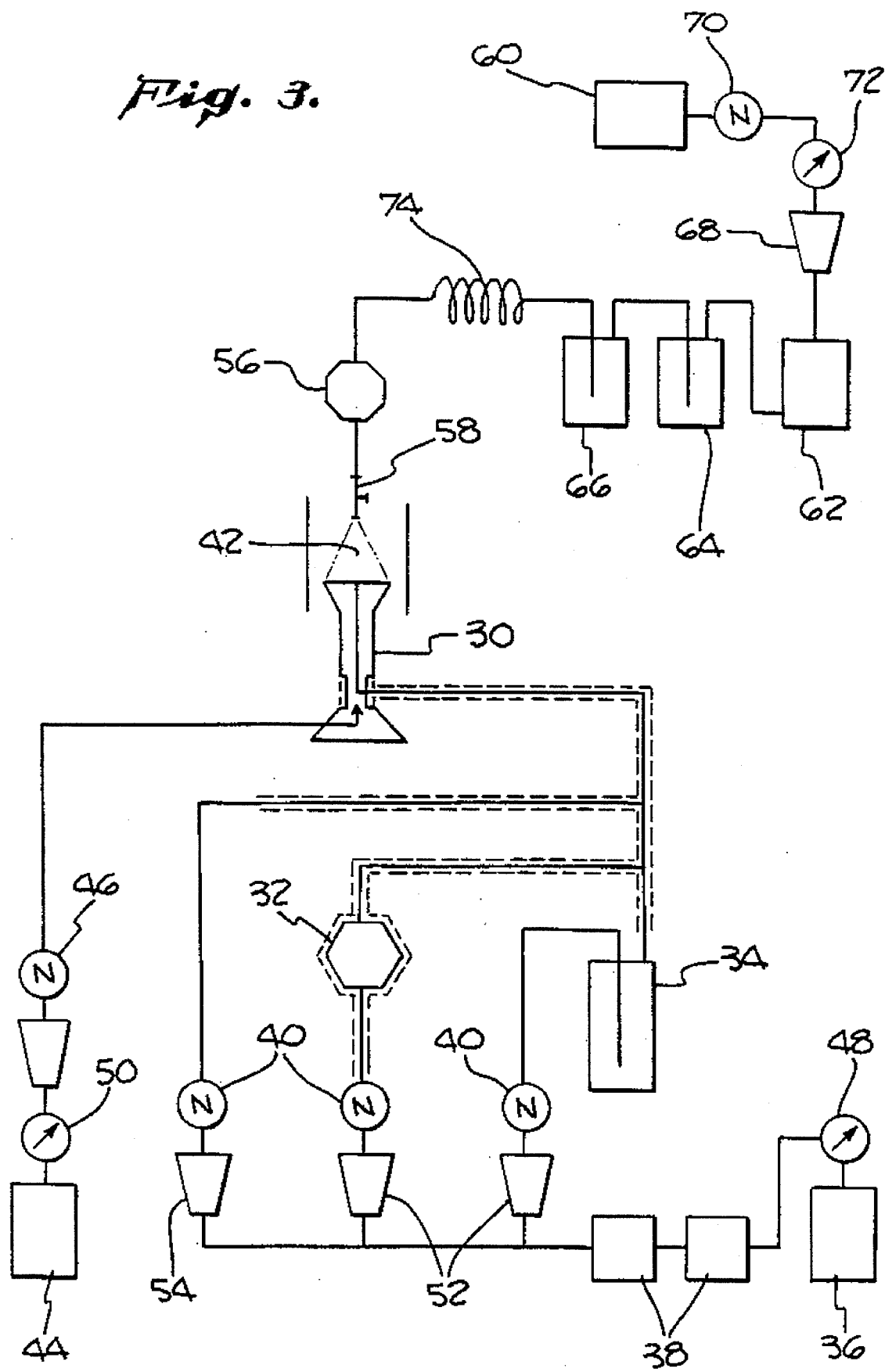

[a]Total cross-sectional area = 1.27 cm$^2$, values are for the three sections in series.
[b]Mass composition measured by atomic absorption spectroscopy of platinum at 265.9 μm.
[c]Dispersion measured by H$_2$—O$_2$ titration at 50° C.
[d]Spherical particle diameter = 1/Dispersion.
[e]Penetration depth measured with a light microscope at 600 ×magnification.
[f]Lower bound only, estimated penetration = 200 μm As can be seen from Table I, the flame-synthesized platinum particles in the three samples range in diameter from between 52 to 66 Ångstroms which is typical of particle sizes in highly active catalysts. The flame-synthesized alumina particles had sizes ranging between about 60 to 300 Ångstroms in diameter. This is the same range found in commercial flame-synthesized aluminum oxide. The penetration listed in Table I is a measure of the depth that the particles penetrate below the surface 24 as pictorially shown in FIG. 2. The portion below the surface 24 is active catalytically and also forms an important part of the reactor bed. When the particles and aggregates deposit on the fiber mat, some penetrate below the mat surface 24 to be caught on interior fibers while others are caught by the topmost fibers and previously deposited particles and aggregates. The structures above the surface 24 are formed because the capture of particles by a fiber make the fiber more efficient, and thus the structures grow off the top fibers. It is believed that the structures above the surface extend a distance which is about equal to ¼ the depth of penetration of the particles below the mat surface 24.

The structure of the support network and catalyst particles produced in the examples was viewed by light microscopy, scanning electron microscopy (SEM) and transmission electron microscopy (TEM). It was found that the platinum particles are intimately interspersed with the alumina. It is believed that the platinum and aluminum oxide particles are distinct, that they aggregate in the flame, and that they remain distinct in the aggregates. The platinum particles are smaller than the alumina particles because the estimated platinum precursor concentration in the carrier gas used in the examples was over two orders of magnitude smaller than the alumina precursor concentration. Based on the number of platinum particles per alumina particles from the TEM photographs, the platinum particles cover from 3 to 15% of the alumina surface. Nevertheless, as seen by SEM, the platinum particles do not alter or otherwise deleteriously affect the alumina network.

The support structure has inter-dendrite spacing of less than 500 Ångstroms which is smaller than the mean free path of the molecules in gas which is about 1,000 Ångstroms at 227° C. Accordingly, Knudsen flow occurs through the networks that form a continuous layer on the filtered surface. Knudsen flow promotes the approach to thermal equilibrium between the gas and the particles. Knudsen flow also precludes pore and boundary layer concentration gradients.

The catalytic activity of the three samples prepared in this example performed as well or better than conventionally supported catalyst particles. For example, the conversion of carbon monoxide as function of inlet temperature was measured over the range 100° to 370° C. at gas velocities of 4, 8, and 12 cm/sec with 2% CO in 150% excess O$_2$ and the balance He for all three samples. In addition, curves were measured for the two low Pt content samples at 4 cm/sec with 5% CO in 150% excess O$_2$ and the balance He. The ignition and extinction temperatures, the conversion at ignition, and the activation energies of these tests for the three samples are summarized in Table II. The conversion after ignition varied randomly within 5% between experiments with different platinum content, gas velocity, and inlet CO concentration; furthermore, the conversion after ignition fluctuated within 3% over the 50° C. range of increasing temperature after ignition. All the samples showed counterclockwise hysteresis.

TABLE II

Summary of Ignition and Extinction Curves.

| Sample number | Superficial gas velocity (cm/sec) | Ignition T (°C.) | Ignition X (%) | Extinction T (°C.) | Activation energy[a] (kcal/mol) |
|---|---|---|---|---|---|
| 1 | 2% inlet CO | | | | |
| | 4 | 262 | 13 | 255 | 9 |
| | 8 | 250 | 3 | 263 | 21 |
| | 12 | 254 | 3 | 253 | 30 |

TABLE II-continued

Summary of Ignition and Extinction Curves.

| Sample number | Superficial gas velocity (cm/sec) | Ignition T (°C.) | Ignition X (%) | Extinction T (°C.) | Activation energy[a] (kcal/mol) |
|---|---|---|---|---|---|
|   | 5% inlet CO |   |   |   |   |
|   | 4 | 293 | 16 | 223 | 23 |
| 2 | 2% inlet CO |   |   |   |   |
|   | 4 | 256 | 11 | 222 | 15[b] |
|   | 8 | 253 | 5 | 245 | 16 |
|   | 12 | 258 | 5 | 243 | 24 |
|   | 5% inlet CO |   |   |   |   |
|   | 4 | 270 | 10 | 182 | 11 |
| 3 | 2% inlet CO |   |   |   |   |
|   | 4 | 229 | 7 | 207 | 13 |
|   | 8 | 222 | 3 | 217 | 22 |
|   | 12 | 244 | 5 | 210 | 22 |

[a]Increasing temperature before ignition.
[b]Decreasing temperature after extinction.

The ignition and extinction curve for sample No. 2 at 4 cm/sec and 2% CO was measured twice. The first time, the reaction mixture was passed into the immobilized free molecule aerosol reactor at 245° C. Ignition occurred instantly. In the second and subsequent experiments, the reaction mixture was passed into the reactor at about 100° C., and ignition was approached gradually. By comparing the two runs, the reproducibility was established for the ignition and extinction points to be about 10° and 2° C., respectively. The estimated uncertainty in conversion is 20%.

The two low Pt mass loading samples (Nos. 1 and 2) showed from a twofold to sixfold increase in the width of the hysteresis loop with an increase in inlet carbon monoxide concentration from 2 to 5%. The position of the hysteresis loop shifted towards higher temperatures with increasing gas velocity. In the low conversion range, at a fixed temperature, the conversion decreased with increasing gas velocity. Higher platinum content gave lower ignition temperatures. Only the high Pt mass loading sample (No. 3) showed significant increase in the ignition temperature and the width of the hysteresis loop with gas velocity.

The Arrhenius activation energies were obtained for the increasing temperature values before ignition at less than 2% conversion for the 2% inlet CO concentration runs, and at less than 1% conversion for the 5% inlet CO concentration runs. The standard deviation of the activation energy is 0.5 kcal/mole.

The activation energy increased with increasing gas velocity. The increase becomes less significant with higher total loading. Calculating the activation energies using points up to ignition, about 5 to 10% conversion, gave activation energies up to 9 kcal/mol different than reported in Table II. For four trials, activation energies calculated for decreasing temperature after extinction were up to 9 kcal/mol higher than the values calculated for increasing temperature before ignition.

Having thus described preferred exemplary embodiments of the present invention, it should be noted by those skilled in the art that the within disclosures are exemplary only and that various other alternatives, adaptations and modifications may be made within the scope of the present invention. Accordingly, the present invention is not limited by the specific embodiments as illustrated herein, but is only limited by the following claims.

What is claimed is:

1. A catalytic reactor bed comprising:

an anchor surface comprising a plurality of inert fibers having diameters between about 0.1 microns to 10 microns;

a dendritic support particle network attached to and extending outward from said anchor surface, said support particle network comprising a plurality of support particles having particle sizes in the range of about 50 to 500 Ångstroms; and a plurality of discrete catalyst particles attached to said support particles and dispersed throughout said support particle network, said catalyst particles having particle sizes in the range of about 10 to 80 Ångstroms.

2. A catalytic reactor bed according to claim 1 wherein said support particles consist essentially of alumina, silica, or titania.

3. A catalytic reactor bed according to claim 2 wherein said catalyst particles consist essentially of platinum or palladium.

4. A catalytic reactor bed according to claim 3 wherein said support particles consist essentially of alumina and said catalyst particles consist essentially of platinum.

5. A catalytic reactor bed according to claim 4 wherein said anchor surface comprises a plurality of quartz fibers.

6. A catalytic reactor bed according to claim 5 wherein said quartz fibers have a diameter of about 1 micron, said catalyst particles have an average size of about 35 Ångstroms and said support particles have an average size of about 150 Ångstroms.

7. A catalytic reactor bed according to claim 1 wherein said catalyst particles consist essentially of platinum, rhenium, copper oxide, or palladium.

8. A catalytic reactor bed according to claim 1 wherein said inert fibers consist essentially of quartz, glass, ceramic or carbon.

9. A catalytic reactor bed according to claim 1 wherein said support particle network extends outward from said anchor surface a distance of between about 10 microns to 300 microns.

10. A method for making a catalytic reactor comprising the steps of:

introducing a support particle precursor into a heating zone;

introducing a catalyst particle precursor into said heating zone;

heating said support particle precursor and said catalyst particle precursor together in said heating zone at a sufficient temperature and for a sufficient time to form support particles having a particle size range of about 50 to 500 Ångstroms and catalyst particles having a particle size range of about 10 to 80 Ångstroms; and depositing said support particles and catalyst particles onto an anchor surface to form a support particle network attached to and extending outward from said anchor surface wherein said catalyst particles are dispersed as discrete particles throughout said support particle network at spaced locations.

11. A method for making a catalytic reactor bed according to claim 10 wherein said support particle precursor is converted to said support particles in said heating zone at faster rate than said catalyst particle precursor is converted into said catalyst particles.

12. A method for making a catalytic reactor bed according to claim 11 wherein said catalyst particle precursor is platinum (II) bis-(hexafluoroacetylacetonate) platinum (II) bis-(acetylacetonate), palladium (II) bis-(hexafluoroacetylacetonate) or palladium (II) bis-(acetylacetonate).

13. A method for making a catalytic reactor bed according to claim 11 wherein said support particle precursor is trimethylaluminum and said catalyst particle precursor is platinum (II) bis-(hexafluoroacetylacetonate).

14. A method for making a catalytic reactor bed according to claim 11 wherein said support particle precursor is trimethylaluminum, triethylaluminum, triisobutylaluminum or aluminum tri-sec-butoxide.

15. A method for making a catalytic reactor bed according to claim 10 wherein said heating zone is a flame.

* * * * *